United States Patent [19]
Schull

[11] Patent Number: 5,901,201
[45] Date of Patent: May 4, 1999

[54] SWITCH-BASED LINE CONTINUITY VERIFICATION METHOD AND SYSTEM

[75] Inventor: Jerome W. Schull, Marietta, Ga.

[73] Assignee: Bellsouth Corporation, Atlanta, Ga.

[21] Appl. No.: 08/856,309

[22] Filed: May 14, 1997

[51] Int. Cl.$^6$ .............................. H04M 1/24; H04M 3/08; H04M 11/04
[52] U.S. Cl. .................................. 379/5; 379/26; 379/33; 379/44; 379/29
[58] Field of Search ................................... 379/1, 2, 5, 6, 379/10, 23, 24, 26, 27, 29, 33, 43, 44, 106.01, 45, 25, 31, 34, 37; 371/20.3, 20.5

[56] References Cited

U.S. PATENT DOCUMENTS

| | | | |
|---|---|---|---|
| 4,296,492 | 10/1981 | Hafer | 370/14 |
| 4,442,320 | 4/1984 | James et al. | 179/5 |
| 4,528,423 | 7/1985 | James et al. | 179/5 |
| 4,566,093 | 1/1986 | Diaz | 379/6 |
| 4,718,079 | 1/1988 | Rabito | 379/2 |
| 4,741,022 | 4/1988 | Chebra et al. | 379/106 |
| 4,864,598 | 9/1989 | Lynch et al. | 379/6 |
| 4,903,292 | 2/1990 | Dillion | 379/26 |
| 4,937,851 | 6/1990 | Lynch et al. | 379/6 |
| 5,073,919 | 12/1991 | Hagensick | 379/29 |
| 5,392,328 | 2/1995 | Schmidt et al. | 379/10 |
| 5,416,825 | 5/1995 | Renger et al. | 379/29 |
| 5,426,688 | 6/1995 | Anand | 379/5 |
| 5,473,596 | 12/1995 | Garafola et al. | 370/13 |
| 5,504,753 | 4/1996 | Renger et al. | 371/20.1 |
| 5,577,098 | 11/1996 | Wani | 379/1 |
| 5,802,143 | 9/1998 | Borchering et al. | 379/32 |

FOREIGN PATENT DOCUMENTS 0 565 211   10/1993   European Pat. Off. .

Primary Examiner—Paul Loomis
Assistant Examiner—Rexford N. Barnie
Attorney, Agent, or Firm—Jones & Askew, LLP

[57] ABSTRACT

In a security and alarm service environment, a method and system for verifying the continuity of a telephone line 317 connected to a subscriber terminal unit (STU) 310 at a customer's premises. The STU 310 is connected by telephone line 317 to a network interface 315 which is connected to a line unit 320 by a twisted pair 325. Line unit 320 is located in remote terminal 330 which is connected to switch 335 by digital loop 340. Switch 335 is connected to scanner 345 by trunk group 350 and SMDI link 355. A low tone generator in STU 310 generates a low frequency tone that is transmitted to line unit 320. If telephone line 317 is cut, if STU 310 malfunctions, or if an alarm condition at the customer's premises is detected by STU 310, then the low tone is not received by line unit 320. Remote terminal 330 encodes a signaling bit that is transmitted over digital loop 340 to switch 335. The encoded signaling bit indicates whether or not the low tone was received by line unit 320. Switch 335 reads the encoded signaling bit and, if the encoded signaling bit indicates that the low tone was not received, sends a directory number to the scanner 345. The switch 335 connects the scanner 345 to the telephone line 317 so that the alarm service provider can query the STU 310 to determine the problem.

17 Claims, 4 Drawing Sheets

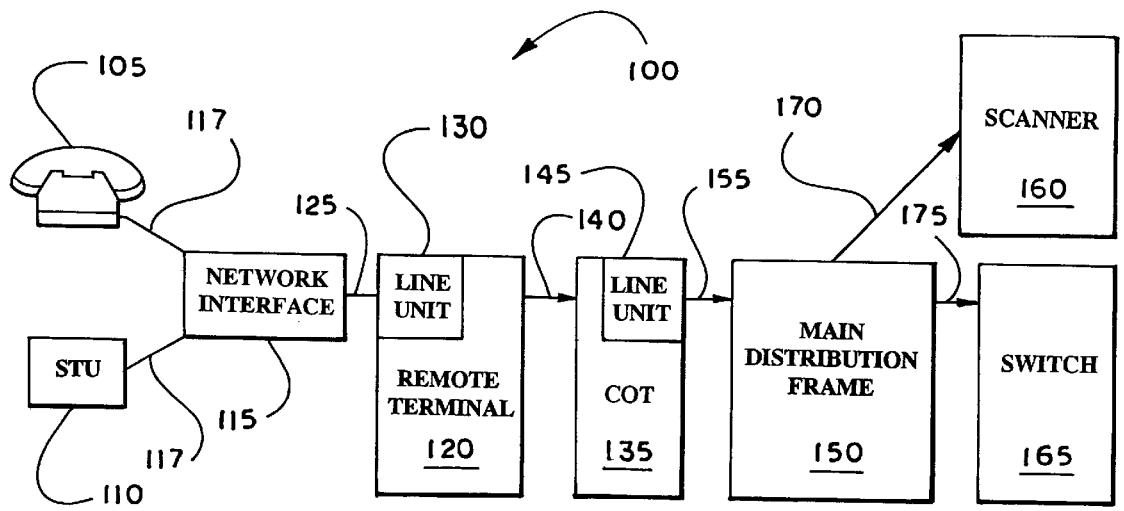
Fig_1 PRIOR ART
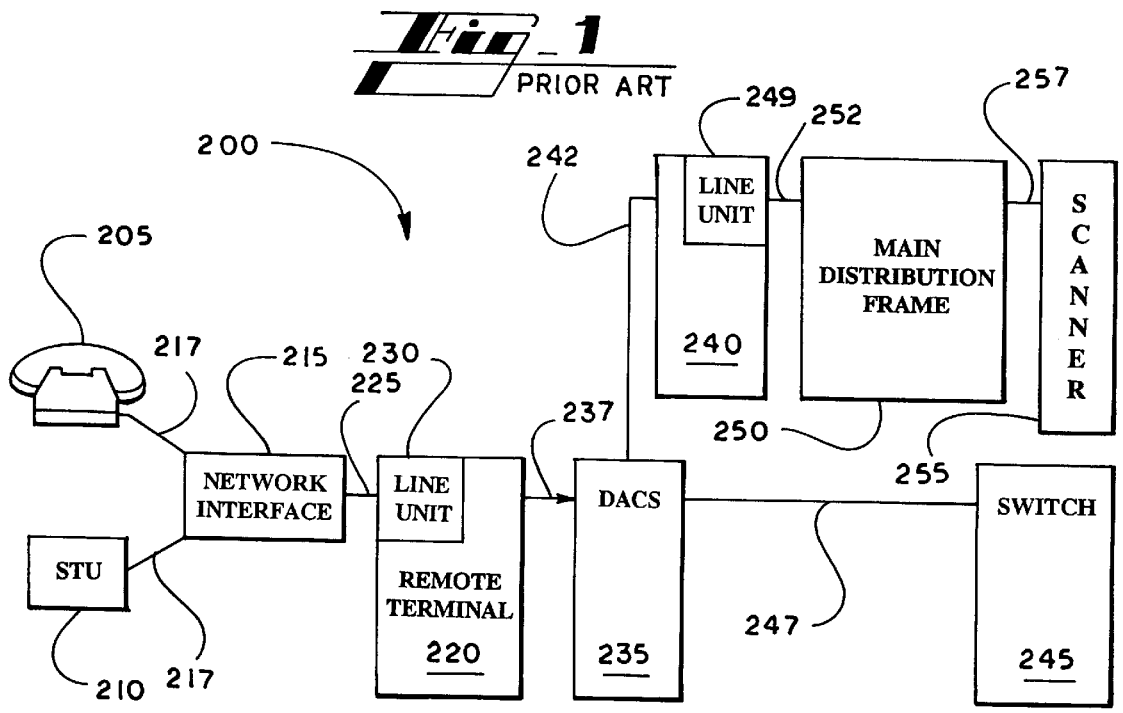
Fig_2 PRIOR ART

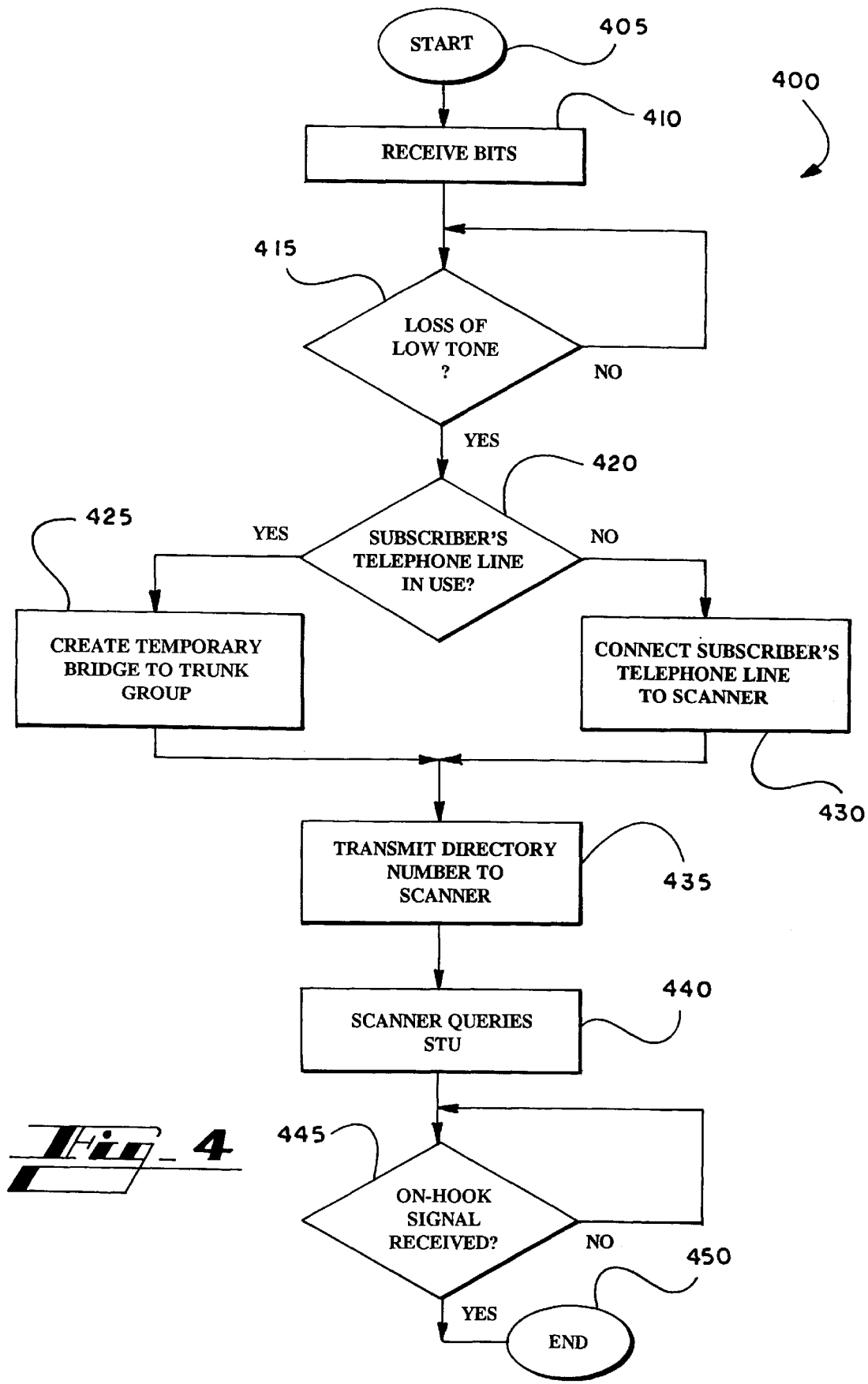

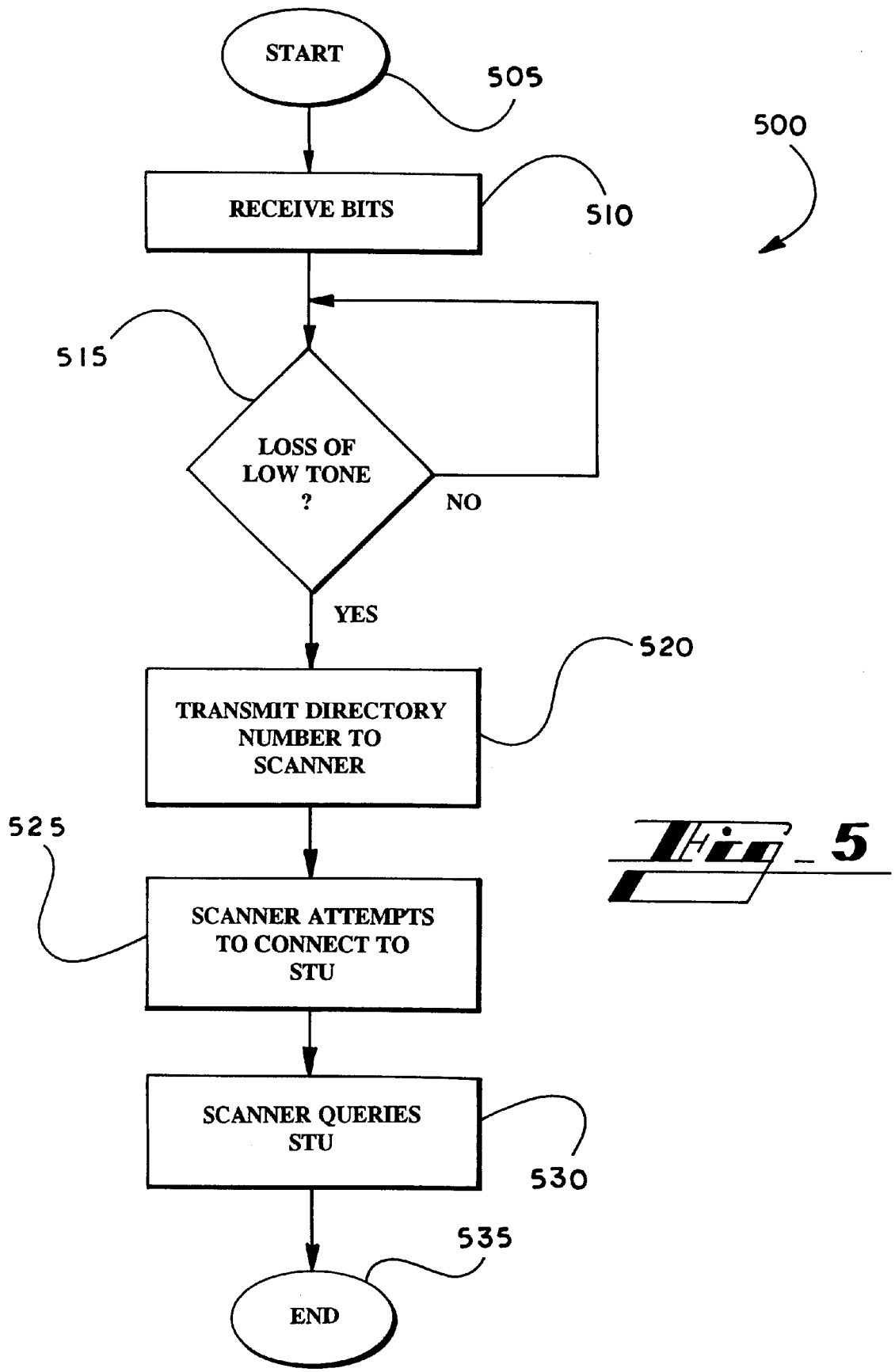

SWITCH-BASED LINE CONTINUITY VERIFICATION METHOD AND SYSTEM

FIELD OF THE INVENTION

The present invention generally relates to communication systems, and more particularly, relates to a method and system for verifying the continuity of a communications line. Even more particularly, the present invention relates to a switch-based method and system for verifying the continuity of a telephone line for use with applications such as security and alarm systems.

BACKGROUND OF THE INVENTION

Burglar alarms, fire alarms and other security monitoring alarms have become commonplace in modern society. The competition for customers, or subscribers, has become fierce among alarm service providers. Alarm service providers who can provide fast and effective alarm service at a low price have the best chance of surviving in this competitive environment. Thus, alarm service providers are searching for ways to provide cheaper, faster and more effective service to their customers.

A typical alarm system includes a subscriber terminal unit, or STU, located at the customer's premises. The STU can be connected to a number of different alarm sensors located throughout the customer's premises. The STU is connected to the alarm service provider by a telephone line. When necessary, the STU performs various tasks by sending signals to the alarm service provider and receiving signals from the alarm service provider over the telephone line. Alarm service is not possible if the telephone line malfunctions or is cut, because signals can not be sent back and forth between the alarm service provider and the STU. Therefore, most alarm service providers verify the continuity of the telephone line connected to the STU, i.e., monitor that the telephone line is operating properly, because the telephone line is critical for effective alarm service.

Systems are known for verifying the continuity of a telephone line connected to a STU. In one known system, designed for use with a twisted copper pair transmission medium, the subscriber terminal unit (STU) transmits a constant low frequency tone, or low tone (LT), over the twisted copper pair to a central office. When the LT is no longer detected at the central office, such as when the telephone line is cut, either: (1) the alarm service provider is notified that there is a problem, or (2) the central office sends a signal back to the STU to determine the problem with the STU.

Although the system described above for transmitting and monitoring a low tone works when the transmission medium is strictly a twisted copper pair, many new transmission links are digital. Problems are encountered when the transmission medium includes a digital transmission link because the low tone is filtered out. Thus, alternative systems for verifying the continuity of a customer's telephone line have been developed for use with digital loop carriers (DLCs), such as the system shown in FIG. 1.

FIG. 1 is a block diagram illustrating a known system 100 for verifying the continuity of a telephone line for use with a non-integrated digital loop system. A non-integrated digital loop system includes a digital transmission link, but the digital transmission link is terminated in a main distribution frame before reaching a switch. System 100 includes a telephone handset 105 and a subscriber terminal unit (STU) 110, each of which are connected to network interface 115 by a telephone line 117. Both telephone handset 105 and STU 110 are located at a customer's premises. Network interface 115 is connected to remote terminal 120 by twisted pair 125.

Twisted pair 125 terminates in a first line unit 130 of remote terminal 120. Remote terminal 120 is connected to central office terminal 135 by digital loop 140. A second line unit 145, located at central office terminal 135, is connected to a main distribution frame (MDF) 150 by twisted pair 155. The main distribution frame 150 is connected to a scanner 160 and a switch 165 by twisted pairs 170 and 175, respectively. Although only one scanner is shown in FIG. 1, there may be numerous scanners, associated with a number of different alarm service providers, connected to MDF 150.

As described above, when the transmission medium is strictly a twisted copper pair, a STU transmits a constant low tone (LT) over the twisted copper pair to a central office. However, when the transmission medium includes a digital transmission link, such as digital loop 140 in FIG. 1, the low tone, because of its low frequency, is filtered out at the remote terminal 120. Therefore, to overcome this problem, the system 100, shown in FIG. 1, was developed.

The system 100 shown in FIG. 1 functions as follows. STU 110 includes a low tone generator (not shown) that transmits a low frequency tone, or low tone (LT), over telephone line 117 and twisted pair 125. The first line unit 130 (LU) monitors for the low tone on twisted pair 125. Remote terminal 120 encodes a signaling bit carried between the remote terminal 120 and the central office terminal (COT) 135 over digital loop 140. The signaling bit is encoded to indicate whether the LT was or was not received by the first line unit 130.

The COT 135 monitors the signaling bit and instructs a low tone generator (not shown) in the second LU 145 either to transmit a LT or not to transmit a LT. If the signaling bit indicates that the LT was received by the first LU 130, then the low tone generator in the second LU 145 is instructed to transmit the LT. The second LU 145 transmits the LT over twisted pair 155 and twisted pair 170 to scanner 160. The scanner 160, monitored by the alarm service provider, detects the LT to verify the continuity of telephone line 117.

However, if the signaling bit indicates that the LT was not received by the first LU 130, then the low tone generator in the second LU 145 does not transmit the LT. The scanner 160 then detects that the LT is not being generated and that the telephone line 117 has been cut or is otherwise malfunctioning. The alarm service provider then initiates a telephone call to the STU 110 in an attempt to determine the nature of the malfunction.

The system 100 described above in reference to FIG. 1 functions with non-integrated digital loop carriers. However, for integrated digital loop carriers, the system 100 does not function properly because there is no central office terminal between the remote terminal and the switch to recognize the signaling bit. In addition, the switch is unable to recognize the signaling bit that indicates whether the low tone was received.

Thus, a system 200, shown in FIG. 2, was developed to monitor for line continuity when the transmission medium includes an integrated digital loop carrier. FIG. 2 is a block diagram illustrating a known system 200 for verifying the continuity of a telephone line when the transmission medium includes an integrated digital loop carrier. Telephone handset 205 and subscriber terminal unit (STU) 210 are connected to network interface 215 by telephone line 217. Network interface 215 is connected to remote terminal 220 by twisted pair 225. Twisted pair 225 terminates in a first line unit 230 of remote terminal 220. Remote terminal 220 is connected to digital cross-connect system (DACS) 235 by digital loop 237.

DACS 235 is connected to dedicated central office terminal 240 by digital loop 242. DACS 235 is also connected to switch 245 by digital loop 247. A second line unit (LU) 249, at dedicated central office terminal 240, is connected to a main distribution frame 250 by twisted pair 252. MDF 250 is connected to a scanner 255 by twisted pair 257.

In system 200, STU 210 generates a low tone (LT) that is transmitted over telephone line 217 and twisted pair 225 to first line unit (LU) 230. Remote terminal 220 encodes one of the signaling bits that is transmitted over digital loop 237 to DACS 235. The encoded signaling bit indicates whether the low tone was or was not received by the first LU 230. At DACS 235, the channels of digital loop 237 that are associated with an alarm service provider are extracted and sent over digital loop 242 to dedicated central office terminal 240.

The dedicated central office terminal 240 monitors the encoded signaling bit. If, based upon the encoded signaling bit, it is determined that the low tone was received by the first LU 230, then a low tone generator in the second LU 249 generates a low tone that is sent to MDF 250 and to scanner 255. However, if it is determined that the low tone was not received by the first LU 230, then the low tone generator in the second LU 249 is deactivated and the low tone is not transmitted to scanner 255. The scanner 255 then detects the loss of low tone and the alarm service provider connects to STU 210 via a telephone call.

The cost of system 200 is great because of the expense of equipment such as DACS 235, dedicated COT 240 and MDF 250. In addition, the systems 100 and 200 described above suffer from a lack of speed in recognizing the loss of the low tone signal. In emergency situations, a matter of seconds can be critical. Sometimes, the seconds that are lost while the scanner receives the loss of LT, recognizes it, and determines the problem can be detrimental to the effective handling of the emergency. One reason that seconds are lost is that it often takes several seconds before the loss of LT is received by the scanner because of the number of components in these systems. The scanner also requires several seconds to recognize the loss of LT. In addition, it can take several seconds for the alarm service provider to connect to the STU to query the STU and determine the problem with the STU.

Thus, there is a need in the art for a system for verifying the continuity of a telephone line that is quicker, more efficient and less expensive than prior systems.

There is a need in the art for an improved system for verifying the continuity of a telephone line for use with an integrated digital loop transmission medium.

There is a further need in the art for a system for verifying the continuity of a telephone line that does not require a dedicated central office terminal.

There is a further need in the art for a system for verifying the continuity of a telephone line that does not require a main distribution frame.

SUMMARY OF THE PRESENT INVENTION

As will be seen, the present invention satisfies the foregoing criteria. Stated generally, the present invention provides a system and method for verifying the continuity of a connection between a monitored premises and a security network.

More particularly, in one embodiment, the method is for verifying the continuity of a connection between a monitored premises and a security network in a security monitoring environment. A subscriber terminal unit in a monitored premises transmits a signal over the connection to the security network. The signal represents that the monitored premises is secure. A line unit in a remote terminal of the security network may monitor for the receipt of the signal. If the signal is not received by the line unit, then the line unit encodes a signaling bit to represent that the monitored premises is not secure. The line unit transmits the signaling bit, also known as an encoded signaling bit or low tone status signaling bit, to a switch. Alternatively, a line unit in a switch may monitor for the receipt of the signal. In response to receiving the signaling bit, the switch sends an identification of the monitored premises to a scanner of the security network. The scanner is then connected to the monitored premises. Alternatively, the scanner may be immediately connected to the monitored premises via a trunk circuit and then the switch may send the directory number associated with the monitored premises to the scanner.

In one embodiment, the step of connecting the scanner to the monitored premises is accomplished by creating a temporary bridge to connect the scanner to the subscriber terminal unit. In yet another embodiment, the step of connecting the scanner to the monitored premises is accomplished using a switch connection.

In still another embodiment, the signal is a low tone signal which is transmitted over the telephone line. In another embodiment, the encoded signaling bit is an ABCD signaling bit.

In still another embodiment, the present invention is a method for verifying the continuity of a telephone line connected to a subscriber terminal unit. A low tone generator of the subscriber terminal unit transmits a low frequency tone, preferably thirty-six Hertz, which is monitored by a line unit. The line unit may be located in a remote terminal or a switch. The line unit encodes at least one signaling bit, preferably an ABCD signaling bit, to indicate whether or not the low frequency tone was received and sends the encoded signaling bit to a switch over a digital loop carrier. The switch determines whether the encoded signaling bit indicates that the low frequency tone was not received. If so, the switch transmits a directory number corresponding to the telephone line to a scanner. The switch may transmit the directory number out-of-band by sending the directory number associated with the connecting office equipment via an SS7 or SMDI link. The scanner uses the directory number to query the subscriber terminal unit. In one embodiment, the scanner may query the subscriber terminal unit by making a direct or bridged ringless connection via enhanced UTT trunks.

In an alternative embodiment, the method further includes the step of determining whether an on-hook signal has been received in response to querying of said subscriber terminal unit. In another embodiment, the method further includes the steps of determining whether the telephone line is in use and, if so, then connecting the telephone line to the scanner by creating a temporary bridge between the scanner and a trunk group.

In yet another embodiment, the present invention is a system for verifying the continuity of a telephone line. The system includes a subscriber terminal unit and a low tone generator operative to generate a low frequency tone that is transmitted over the telephone line. The system further includes a line unit connected to the subscriber terminal unit by the telephone line. The line unit determines whether the low frequency tone is received from the low tone generator. The system also includes a remote terminal that encodes a signaling bit as an encoded bit. The encoded bit is indicative of whether the low frequency tone is received by the line unit. The system includes a digital loop carrier connecting the line unit to a switch. The digital loop carrier transmits the encoded bit to the switch. The system further includes a scanner connected to the switch.

In yet another embodiment, the system of the present invention includes an alarm sensor connected to the subscriber terminal unit. The alarm sensor sends alarm signals to the subscriber terminal unit. The subscriber terminal unit detects and responds to the alarm signal by instructing the low tone generator to stop generating the low frequency tone.

The present invention is an improvement upon the prior art systems of notifying alarm service providers. The system of the present invention uniquely connects the scanner to the STU. The system also may send the directory number of the subscriber's telephone line to the scanner so that the scanner immediately knows the identity of the customer's premises. The scanner may then immediately query the STU. Alternatively, the system may immediately connect the subscriber terminal unit to the scanner by a ringless connection via a direct or bridged trunk circuit. The switch in the system of the present invention is faster at detecting a loss of low tone than prior art scanners due to the supercomputing capabilities of the switch. Thus, speed is enhanced not only because components of prior art systems have been removed, but also because of the computing capabilities of the switch.

The present invention provides an improved method and system for verifying the continuity of a telephone line connected to a subscriber terminal unit in an alarm system environment. The system of the present invention is less expensive than prior art systems because less components are needed. In addition, the speed of detecting the loss of low tone is increased because the loss of low tone signal travels through fewer components and because the detection of the loss of low tone is performed by a switch with a supercomputer, rather than a scanner. The present invention also has the advantage that when a loss of low tone is detected, the directory number is transmitted to the scanner and the scanner is immediately connected to the telephone line, so that the identity of the customer's premises is immediately known and the STU may be immediately queried as to its' status.

It is an object of the present invention to provide an improved method and system for verifying the continuity of a telephone line.

It is a further object of the present invention to provide a method and system for verifying the continuity of a telephone line that is quicker, more efficient and less expensive than present systems.

It is also an object of the present invention to provide a method and system that does not require a dedicated central office terminal.

It is also an object of the present invention to provide a method and system that does not require a main distribution frame.

It is an object of the present invention to provide an improved system for verifying the continuity of a telephone line for use with an integrated digital loop transmission medium.

It is a further object of the present invention to provide a system for verifying the continuity of a telephone line that does not require a main distribution frame.

Other features and advantages of the present invention will be apparent to persons skilled in the art from the following detailed description of a preferred embodiment accompanied by the attached drawings wherein identical reference numerals will refer to like parts and steps in the various views.

BRIEF DESCRIPTION OF THE DRAWINGS

FIG. 1 is a block diagram illustrating a known system for verifying the continuity of a telephone line for use with a non-integrated digital transmission link.

FIG. 2 is a block diagram illustrating a known system for verifying the continuity of a telephone line for use with an integrated digital transmission link.

FIG. 4 is a flow chart illustrating the preferred method of the present invention.

FIG. 5 is a flow chart illustrating an alternative embodiment of the method of the present invention.

DETAILED DESCRIPTION OF THE PREFERRED EMBODIMENT

Figure 3:
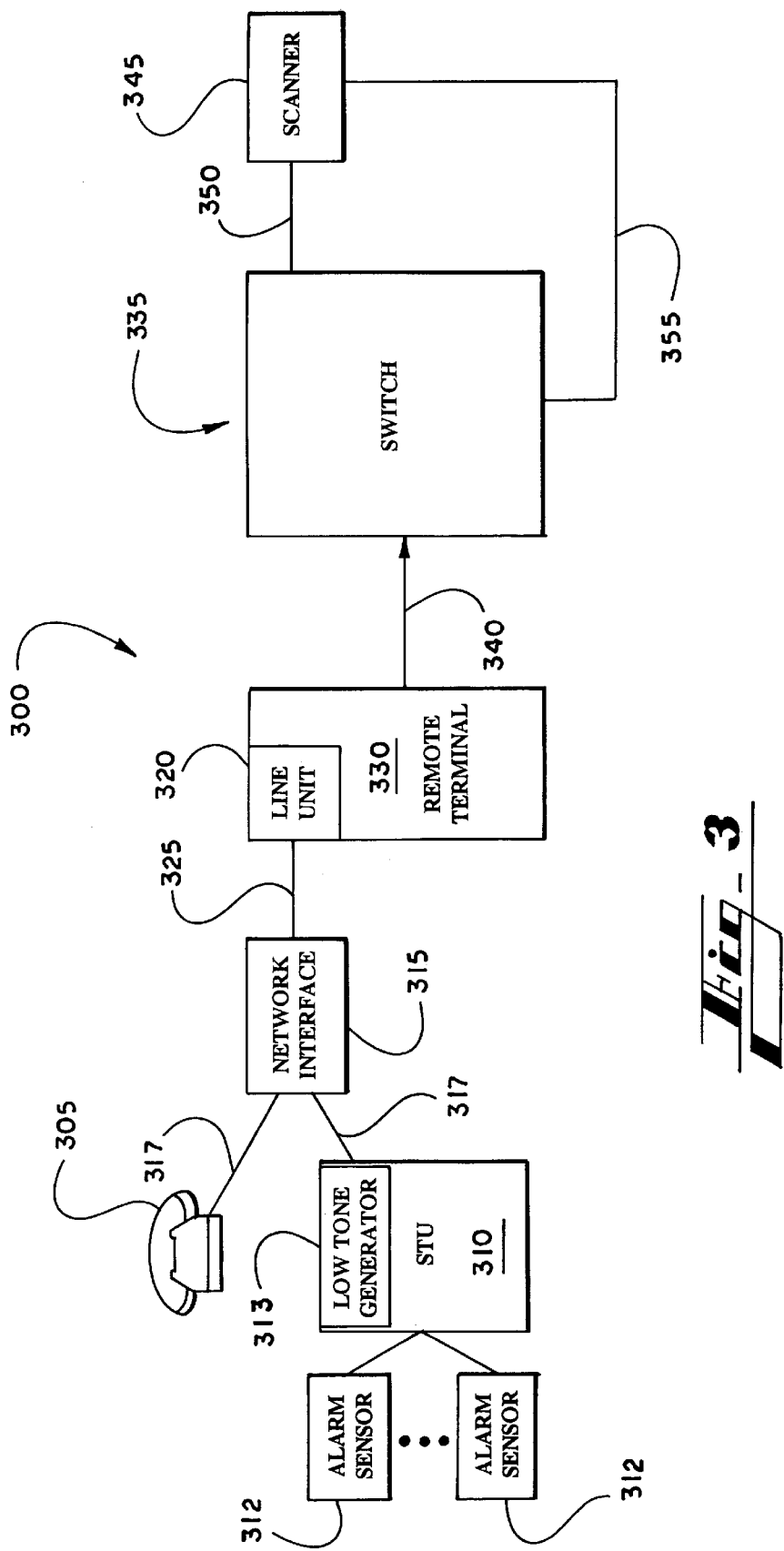
FIG. 3 is a block diagram of the preferred system of the present invention for monitoring for the continuity of a telephone line.

Generally described, the present invention provides a switch-based method and system for verifying the continuity of a telephone line. More particularly described, the present invention preferably provides a switch-based method and system for verifying the continuity of a telephone line by monitoring a signaling bit in the context of an alarm system.

Briefly described, the preferred system of the present invention includes a switch that monitors a low tone status signaling bit from a remote terminal for a loss of low tone indication. The switch recognizes the loss of low tone indication in the low tone status signaling bit. The switch then either: (1) automatically connects a scanner to a subscriber terminal unit (STU) and sends a directory number to the scanner; or, (2) sends a directory number to the scanner so that the scanner may attempt to connect to the STU via enhanced Utility Telemetry Trunks, or UTT trunks.

In one embodiment of the present invention, when the low tone status signaling bit is set so that it indicates a loss of low tone, the switch connects a subscriber's telephone line through a predetermined trunk group to the scanner. The switch determines whether or not the subscriber's telephone line is in use, such as when the subscriber is having a telephone conversation over the telephone line. If the subscriber's telephone line is in use, then a temporary bridge is created from the scanner to the trunk group to connect the scanner to the subscriber's telephone line. If the subscriber's telephone line is not in use, then the subscriber's telephone line is preferably connected to the scanner through a trunk group. Preferably, the connection between the scanner and the subscriber's telephone line is a ringless connection such as is known to those skilled in the art. After the scanner is connected to the subscriber's telephone line, either through using the temporary bridge or the direct trunk group, the switch may transmit, preferably inband, the directory number of the subscriber's telephone line to the scanner. The scanner may then immediately query the STU as to the status of the STU. A query of the status of the STU can include determining whether the STU has received any alarm conditions from the alarm sensors and determining whether the subscriber's telephone line is functioning properly. After determining the status of the STU, the scanner preferably sends an on-hook signal to the switch. The switch then drops the connection between the STU and the scanner. If the on-hook signal is not received by the switch, then the connection between the STU and the scanner will time out in a predetermined amount of time.

In an alternative embodiment of the present invention, when the low tone status signaling bit indicates a loss of low tone, the switch preferably sends the directory number of the subscriber's telephone line to the scanner via a SMDI link or other network address using the Signaling System 7 (SS7) protocol. The SS7 protocol is well-known to those skilled in the art and is described in a specification promulgated by the American National Standards Institute (ANSI). After receiving the directory number of the subscriber's telephone line, the scanner may attempt a direct or bridged ringless connection to the STU via enhanced UTT trunks. Once connected, a query of the status of the STU is performed.

Having briefly described the present invention, a more detailed description of the present invention is presented below in connection with FIGS. 3–5.

FIG. 3 is a block diagram of the preferred system 300 of the present invention for monitoring for the continuity of a telephone line. The system 300 includes a telephone handset 305 and a subscriber terminal unit (STU) 310 located at the premises of a customer who has subscribed to an alarm service. Telephone handset 305 is a conventional telephone such as is known to those skilled in the art. STU 310 is connected to one or more alarm sensors 312 located throughout the customer's premises. When an alarm sensor 312 detects an alarm condition, such as a fire or a broken window, its sends an alarm signal to the STU 310 so that the STU 310 can notify the alarm service provider.

STU 310 is customer premises equipment, i.e., a piece of equipment that is connected to the telephone network and resides on the customer's premises. STU 310 includes a low tone generator 313 that generates a constant low frequency tone, or low tone (LT). The LT preferably has a frequency of 36.5 Hz and is inaudible to humans. Thus, the LT does not interfere with sounds transmitted over telephone line 317. The LT is transmitted to the alarm service provider, as is fully described below, to assure the alarm service provider that the STU is functioning properly and that the telephone line 317 connected to the STU has not been cut by an intruder. Alternatively, the low tone may also indicate that no alarm conditions have been received by STU 310 from alarm sensors 312.

The telephone handset 305 and STU 310 are connected to network interface 315 by telephone line 317. STU 310 transmits the LT over telephone line 317. Network interface 315 is the point of interconnection between the telephone company (or service provider's) communications facilities and the customer's premises. Network interface 315 is preferably a modular jack, well-known to those skilled in the art.

Network interface 315 is connected to line unit 320 by a twisted copper pair 325. The line unit 320 is associated with a remote terminal 330. The line unit 320 includes functionality to monitor for the LT generated by the low tone generator 313 in STU 310. The remote terminal 330 is an analog-to-digital transition point connecting the twisted copper pair 325 and a digital loop 340.

The remote terminal 330 is connected to a switch 335 by digital loop 340. The digital loop 340 is preferably a T-1 digital transmission link such as is known to those skilled in the art. A T-1 digital transmission link has a bandwidth of 1.544 Mbps, typically including twenty-four voice conversations digitized at 64 Kbps each. In addition to the twenty-four voice channels, many T-1 digital transmission links utilize bits, known as ABCD signaling bits, that are taken from bytes in each T-1 channel. The ABCD signaling bits are typically used to carry status information. Although digital loop 340 is preferably a T-1 digital transmission link, digital loop 340 may be another type of digital transmission link known to those skilled in the art.

The switch 335 is a typical digital switch for telecommunications, such as is well-known to those skilled in the art. However, switch 335 has been programmed with additional functionality which will be described in more detail below. Switch 335 is preferably located at a central office. Those skilled in the art should also recognize that the line unit 320 could be located at switch 335.

Still referring to FIG. 3, the switch 335 is connected to a scanner 345, or other monitoring device, by trunk group 350 and Simplified Message Desk Interface link, or a SMDI link 355. A SMDI link is a low speed link to a switch for use with voice mail system for sending requests for a studder dial tone. Scanners, such as scanner 345, are well-known to those skilled in the art. Scanner 345 is preferably located at a facility of the alarm service provider and is preferably operated and maintained by the alarm service provider. However, the scanner 345 could be maintained at a central office along with switch 335. Scanner 345 is used to monitor a customer's premises by sending signals to STU 310 and receiving signals from STU 310.

Having briefly described the components of system 300, the preferred operation of system 300 will be described below in more detail. The low tone generator 313 in STU 310 generates a low tone (LT), below audible range, that is transmitted over telephone line 317 through network interface 315 over twisted pair 325 to line unit 320. Preferably, the LT generated by STU 310 has a frequency of about thirty-six Hertz. The LT is continuously generated, but can be interrupted if telephone line 317 is cut or malfunctions. The LT may also be interrupted if an alarm condition is detected by an alarm sensor 312.

The line unit 320 has functionality, such as is known to those skilled in the art, to verify that the LT is being received over twisted pair 325. As long as the LT is being received by the line unit 320, the remote terminal 330 encodes a low tone status signaling bit to indicate that the LT is being received by the line unit 320. If the LT is not received by the line unit 320, then the remote terminal 330 encodes the low tone status signaling bit to indicate that the LT is not being received by the line unit 320. For instance, the low tone status signaling bit can be encoded to be a binary one to indicate that the low tone was received, and encoded to be a binary zero to indicate that the low tone was not received, or vice versa. Preferably, the low tone status signaling bit is the "B" bit of the ABCD signaling bits of digital loop 340, however, another available signaling bit could be used to indicate the low tone status, i.e., whether or not the low tone was received. The low tone status signaling bit is transmitted over digital loop 340 along with the other voice and control channels of digital loop 340.

Switch 335 contains functionality, i.e., is programmed, to allow the switch to monitor the low tone status signaling bit. If the low tone status signaling bit indicates that the LT was received by the line unit 320, then the switch 335 does not send any indication to the scanner 345 because the continuity of the telephone line 317 has been verified.

However, if telephone line 317 has been cut, if the STU 310 has been tampered with such that the STU no longer generates the LT, or if the low tone has been "shorted" to indicate an alarm condition, then the line unit 320 does not receive the LT. The remote terminal 330 encodes the low tone status signaling bit to indicate that the LT has been lost, i.e., is no longer being received by the line unit 320. The switch 335 preferably then receives the low tone signaling bit that indicates the LT has been lost and notifies the scanner 345 in one of two ways.

In one notification method, the switch 335 preferably determines whether or not the subscriber's telephone line 317 is in use. If it is, a temporary bridge (not shown) from scanner 345 to trunk group 350 is created to connect the scanner 345 to the subscriber's telephone line 317. If the subscriber's telephone line is not in use, then switch 335 preferably connects the subscriber's telephone line 317 to the scanner 345 through trunk group 350. In either event, the connection is preferably a ringless connection, such as is known to those skilled in the art.

After the scanner 345 is connected to the subscriber's telephone line 317, either by temporary bridge or trunk group 350, the switch 335 transmits the directory number of the subscriber's telephone line 317 to the scanner 345. The scanner 345 may then query the STU 310 as to the status of the STU. After determining the status of the STU 310, the scanner 345 sends an on-hook signal to the switch 335 and the switch drops the connection between the trunk group 350 and the scanner 345.

The present invention is an improvement upon the prior art systems of notifying alarm service providers. The present invention uniquely connects the scanner to the STU. The present invention also preferably sends the directory number of the subscriber's telephone line to the scanner so that the scanner immediately knows the identity of the customer's premises. The scanner may then immediately query the STU. The switch is faster at detecting a loss of low tone than prior art scanners due to the supercomputing capabilities of the switch. Thus, speed is enhanced not only because components of prior art systems have been removed, but also because of the computing capabilities of the switch.

The present invention includes a second notification method. In this second notification method, the switch 335 preferably sends the directory number of the subscriber's telephone line to the scanner 345 out-of-band via SMDI link 355. Those skilled in the art will appreciate that an SS7 link may be used rather than SMDI link 355. After receiving the directory number, the scanner 345 connects to the STU 310 via a switch connection. Preferably, the scanner is connected to the STU by a direct or bridged ringless connection via enhanced UTT trunks. Once connected, the scanner 345 performs a query of STU 310 to determine its status. This notification method includes the advantage of quickly notifying the scanner of the directory number of the telephone line so that the scanner can immediately take some action such as notifying a patrol car in the area of the customer's premises or connecting to the STU and querying the STU regarding the problem at the customer's premises. The SMDI link 355 is several times faster at transmitting the directory number than trunk group 350. This second, faster notification is advantageous in some emergency situations. Notification using SMDI link 355 is also advantageous because there are typically a limited number of trunks in trunk group 350. Thus, if many different alarm service subscribers suffer from a loss of low tone at the same time, then the trunk group 350 may become overcrowded. Notification using SMDI link 355 provides an alternative notification method in this overcrowding situation.

The preferred methods of the present invention are described below in reference to FIGS. 4 and 5. FIG. 4 is a flow chart illustrating the preferred method of the present invention. The method 400 begins at start step 405. The method proceeds to step 410 when switch 335 begins to receive bits, including the low tone status signaling bit, over digital loop 340. At decision step 415, it is determined whether or not the low tone has been lost. Preferably, the low tone status signaling bit indicates whether the low tone has been lost. If the low tone status signaling bit indicates that the low tone has not been lost, then the method returns to step 415 to once again determine whether or not the low tone has been lost.

If, at decision step 415, it is determined that the low tone has been lost, then the method proceeds to decision step 420. A determination is made as to whether the subscriber's telephone line 317 is in use at decision step 420. If, at decision step 420, it is determined that the subscriber's telephone line is in use, then a temporary bridge is created from the scanner to the trunk group at step 425. However, if, at decision step 420, it is determined that the subscriber's telephone line is not in use, then the subscriber's telephone line is connected to the scanner at step 430.

After a temporary bridge is created to the trunk group at step 425 or the subscriber's telephone line is connected to a scanner at step 430, then the method proceeds to step 435 and the directory number of the subscriber's telephone line is transmitted to the scanner. The scanner queries the STU regarding the status of the STU at step 440.

The STU preferably sends an on-hook signal to the switch when the scanner has completed its query of the STU. It is determined whether the on-hook signal has been received by the switch at decision step 445. If so, then the method ends at step 450. If not, then the method loops back to step 445 to continue to monitor for the on-hook signal. Alternatively, if the on-hook signal is not received by the switch, then the connection between the STU and the scanner will time out in a predetermined amount of time.

Referring now to FIG. 5, a flow chart illustrating an alternative embodiment of the method of the present invention is described. The method 500 begins at start step 505 and proceeds to step 510 when switch 335 begins to receive bits, preferably over digital loop 340 (FIG. 3). At decision step 515, it is determined whether or not the low tone status signaling bit indicates that the low tone has been lost. If the low tone status signaling bit indicates that the low tone has not been lost, then the method returns to decision step 515 to continue to monitor the low tone status signaling bit.

If, at decision step 515, it is determined that the low tone has been lost, then the method proceeds to step 520. At step 520, the directory number of the subscriber's telephone line is transmitted to a scanner. The switch may send out-of-band the directory number associated with the subscriber's telephone line over an SS7 or SMDI link. The method then proceeds to step 525 where the scanner attempts to make a ringless connection to a STU via enhanced UTT trunks. At step 530, the scanner queries the STU regarding the status of the STU. After the scanner has queried the STU at step 530, the method ends at step 535.

Those skilled in the art will recognize that, although the low tone status signaling bit is preferably the "B" ABCD signaling bit, other bits could be used as the low tone status signaling bit. In addition, indications other than the low tone status signaling bit, such as a series of pulses, could be used to indicate the low tone status without departing from the spirit and scope of the present invention.

The present invention provides an improved method and system for verifying the continuity of a telephone line connected to a subscriber terminal unit in an alarm system environment. The system of the present invention is less expensive than prior art systems because less components are needed. In addition, the speed of detecting the loss of low tone is increased because the loss of low tone signal travels through fewer components and because the detection of the loss of low tone is performed by a switch with a supercomputer, rather than a scanner. The present invention also has the advantage that when a loss of low tone is detected, the directory number is transmitted to the scanner and the scanner is immediately connected to the telephone line, so that the identity of the customer's premises is immediately known and the STU can be immediately queried as to its' status.

It should be noted that embodiments of the present invention include utilizing a ringless connection to query the STU when a loss of low tone is detected. Ringless connections are described in U.S. Pat. No. 5,359,641 and U.S. Pat. No. 5,189,694, incorporated by reference herein.

Given the foregoing disclosure of the preferred embodiment and design parameters for the present invention, other embodiments of the present invention will suggest themselves to those skilled in the art. Therefore, the scope of the present invention is to be limited only by the claims below.

I claim:

1. In a security monitoring environment, a method for verifying the continuity of a connection between a monitored premises and a security network, comprising the steps of:

causing a subscriber terminal unit in said monitored premises to transmit a signal over said connection to said security network, said signal representing that said monitored premises is secure;

causing a line unit in a remote terminal of said security network to monitor for the receipt of said signal from said subscriber terminal unit over said connection;

if said signal is not received by said line unit, then causing said line unit to encode a signaling bit to represent that said monitored premises is not secure;

causing said line unit to transmit said signaling bit to a switch of said security network;

in response to receipt of said signaling bit, causing said switch to send an identification of said monitored premises to a scanner of said security network; and connecting said scanner to said monitored premises.

2. The method recited in claim 1, wherein said step of connecting said scanner to said monitored premises further comprises creating a temporary bridge to connect said scanner to said subscriber terminal unit.

3. The method recited in claim 1, wherein said step of connecting said scanner to said monitored premises further comprises causing said scanner to connect to said subscriber terminal unit by using a switch connection.

4. The method recited in claim 1, wherein said connection is a telephone line;

wherein said signal is a low tone; and wherein said step of causing said subscriber terminal unit to transmit said signal further comprises causing said subscriber terminal unit to transmit said low tone over said telephone line.

5. The method recited in claim 1, wherein said signaling bit is an ABCD signaling bit; and wherein said step of causing said line unit to encode said signaling bit to represent that said monitored premises is not secure further comprises causing said line unit to encode said ABCD signaling bit to represent that said monitored premises is not secure.

6. A method for verifying the continuity of a telephone line connected to a subscriber terminal unit, comprising the steps of:

causing a low tone generator of said subscriber terminal unit to transmit a low frequency tone;

causing a line unit to monitor for the receipt of said low frequency tone from said subscriber terminal unit;

causing said line unit to encode at least one of a plurality of signaling bits to indicate whether or not said low frequency tone was received;

causing a switch to receive said at least one of said plurality of signaling bits over a digital loop carrier from said line unit;

causing said switch to determine whether said at least one of said plurality of signaling bits indicates that said low frequency tone was not received;

if so, causing said switch to transmit a directory number corresponding to said telephone line to a scanner; and causing said scanner to use said directory number to query said subscriber terminal unit.

7. The method recited in claim 6, further comprising the step of determining whether an on-hook signal has been received in response to querying of said subscriber terminal unit.

8. The method recited in claim 6, wherein said plurality of signaling bits are ABCD signaling bits; and wherein said step of causing said line unit to encode said at least one of said plurality of signaling bits to indicate whether or not said low frequency tone was received further comprises causing said line unit to encode said at least one of said plurality of said ABCD signaling bits to indicate whether or not said low frequency tone was received.

9. The method recited in claim 6, wherein said low frequency tone has a frequency of 36.5 Hertz, and wherein said step of causing said low tone generator of said subscriber terminal unit to transmit said low frequency tone further comprises causing a low tone generator of said subscriber terminal unit to transmit said low frequency tone with said frequency of 36.5 Hertz.

10. The method recited in claim 6, further comprising the steps of:

after said step of causing said switch to determine whether said at least one of said plurality of signaling bits indicates that said low frequency tone was not received, then determining whether said telephone line is in use; and if said telephone line is in use, then connecting said telephone line to said scanner.

11. The method recited in claim 10 wherein said connecting step further comprises the step of:

if said telephone line is in use, then creating a temporary bridge between said scanner and a trunk group.

12. A system for verifying the continuity of a telephone line, comprising:

a subscriber terminal unit;

a low tone generator associated with said subscriber terminal unit, said low tone generator operative to generate a low frequency tone that is transmitted over said telephone line;

a line unit connected to said subscriber terminal unit by said telephone line, said line unit operative to determine whether said low frequency tone is received from said low tone generator;

a remote terminal, associated with said line unit, said remote terminal operative to encode at least one of a plurality of signaling bits as an encoded bit, said encoded bit indicative of whether said low frequency tone is received by said line unit;

a digital loop carrier connecting said line unit to a switch, said digital loop carrier operative to transmit said encoded bit to said switch; and a scanner connected to said switch, said scanner operative to receive from said switch a directory number associated with said subscriber terminal unit and further operative to connect to the subscriber terminal unit via the switch and perform a query of the status of the subscriber terminal unit.

13. The system recited in claim 12, wherein said low frequency tone is below audible range.

14. The system recited in claim 12, wherein said low frequency tone is a 36 Hertz tone.

15. The system recited in claim 12, wherein said subscriber terminal unit is connected to an alarm sensor.

16. The system recited in claim 15, wherein said alarm sensor is operative to send an alarm signal to said subscriber terminal unit;

wherein said subscriber terminal unit is operative to detect and to respond to said alarm signal by providing an instruction to said low tone generator to stop generating said low frequency tone; and wherein said Low tone generator is responsive to said instruction to stop generating said low frequency tone.

17. The system recited in claim 12, further comprising a trunk group that connects said switch to said scanner; and a SMDI link that connects said switch to said scanner.

* * * * *